United States Patent
De Pauw et al.

(10) Patent No.: US 11,832,620 B2
(45) Date of Patent: Dec. 5, 2023

(54) ENCAPSULATED FILLINGS

(71) Applicant: PURATOS NV, Groot-Bijgaarden (BE)

(72) Inventors: Paul De Pauw, Wasseige (BE); Jo Libens, Boutersem (BE); Heidi Theunissen, Kortessem (BE)

(73) Assignee: PURATOS NV, Groot Bijgaarden (BE)

( * ) Notice: Subject to any disclaimer, the term of this patent is extended or adjusted under 35 U.S.C. 154(b) by 380 days.

(21) Appl. No.: 15/773,114

(22) PCT Filed: Dec. 2, 2016

(86) PCT No.: PCT/EP2016/079537
§ 371 (c)(1),
(2) Date: May 2, 2018

(87) PCT Pub. No.: WO2017/093455
PCT Pub. Date: Jun. 8, 2017

(65) Prior Publication Data
US 2018/0317503 A1 Nov. 8, 2018

(30) Foreign Application Priority Data

Dec. 2, 2015 (BE) .................................. 2015/5780

(51) Int. Cl.
*A21D 13/38* (2017.01)
*A23P 10/30* (2016.01)
(Continued)

(52) U.S. Cl.
CPC ............. *A21D 13/38* (2017.01); *A21D 2/181* (2013.01); *A21D 2/186* (2013.01); *A21D 2/188* (2013.01);
(Continued)

(58) Field of Classification Search
CPC ........ A21D 13/38; A21D 2/181; A21D 2/186; A21D 2/188; A21D 13/31; A21D 13/80; A23L 27/72; A23P 10/30
See application file for complete search history.

(56) References Cited

U.S. PATENT DOCUMENTS

| 3,352,688 A | 11/1967 | Messina |
| 5,332,595 A | 7/1994 | Gaonkar |

(Continued)

FOREIGN PATENT DOCUMENTS

| CL | 2013002838 A1 | 5/2014 |
| CN | 103260427 A | 8/2013 |

(Continued)

OTHER PUBLICATIONS

Ana Belscak-Cvitanovic et al. "Emulsion templated microencapsulation of dandelion (*Taraxacum officinale* L.) polyphenols and [beta]-carotene by ionotropic gelation of alginate and pectin," Food Hydrocolloids, vol. 57., Jun. 1, 2016 (Jun. 1, 2016), pp. 139-152.

(Continued)

*Primary Examiner* — Katherine D Leblanc
(74) *Attorney, Agent, or Firm* — LATHROP GPM LLP; James H. Velema; Judith L. Stone-Hulslander

(57) ABSTRACT

The present invention relates to fillings for bakery and patisserie products, in particular fillings for cakes and the methods for preparing the fillings as well as the bakery and patisserie products, in particular cakes, comprising the fillings.

21 Claims, 3 Drawing Sheets

(51) Int. Cl.
*A23L 27/00* (2016.01)
*A21D 13/31* (2017.01)
*A21D 13/80* (2017.01)
*A21D 2/18* (2006.01)
*A23L 29/212* (2016.01)
*A23L 29/231* (2016.01)
*A23L 29/256* (2016.01)

(52) U.S. Cl.
CPC ............ *A21D 13/31* (2017.01); *A21D 13/80* (2017.01); *A23L 27/72* (2016.08); *A23L 29/212* (2016.08); *A23L 29/231* (2016.08); *A23P 10/30* (2016.08); *A23V 2002/00* (2013.01)

(56) References Cited

U.S. PATENT DOCUMENTS

| | | | |
|---|---|---|---|
| 6,723,358 B1* | 4/2004 | van Lengerich | A61K 9/0056 426/94 |
| 2003/0064133 A1* | 4/2003 | Blatt | A23P 10/30 426/72 |
| 2010/0310728 A1* | 12/2010 | van Lengerich | A23L 33/115 426/94 |

FOREIGN PATENT DOCUMENTS

| | | |
|---|---|---|
| CN | 105557869 A | 5/2016 |
| EP | 2305742 A1 | 4/2011 |
| JP | 54-160781 A | 12/1979 |
| JP | 03-175928 A | 7/1991 |
| JP | 2002-101822 | 4/2002 |
| JP | 2007-236231 A | 9/2007 |
| WO | WO 99/37158 A1 | 7/1999 |
| WO | WO 2012/084467 A1 | 6/2012 |

OTHER PUBLICATIONS

International Search Report and Written Opinion of PCT/EP2016/079537 dated Feb. 14, 2018, 10 pp.

Sissons, "Role of Durum Wheat Composition on the Quality of Pasta and Bread", Food, 2008, vol. 2, No. 2, pp. 75-90.

Goesaert et al., "Wheat flour constituents: how they impact bread quality, and how to impact their functionality", Trends in Food Science and Technology, 2005, vol. 16, pp. 12-30.

Czuchajowska et al., "Water Activity and Moisture Content of Dough and Bread", Cereal Chem., 1989, vol. 66, No. 2, pp. 128-132.

* cited by examiner

ENCAPSULATED FILLINGS

CROSS-REFERENCE TO RELATED APPLICATIONS

This application is a 35 U.S.C. § 371 filing of International Patent Application No. PCT/EP2016/079537, filed Dec. 2, 2016, which claims priority to Belgium Patent Application No. 2015/5780, filed Dec. 2, 2015, the entire contents of which are incorporated herein by reference.

FIELD OF THE INVENTION

The present invention relates to fillings for bakery and patisserie products, in particular fillings for cakes and the methods for preparing the fillings as well as the bakery and patisserie products, in particular cakes, comprising the fillings.

BACKGROUND OF THE INVENTION

Industrial and semi-industrial food companies specialized in bakery and patisserie products, but also local bakeries offer a large assortment of baked products with incorporated fillings. Examples of baked products typically containing fillings are breads, toast breads, brioches, buns, panettone, donuts, cakes, steam cakes, cream cakes, sponge cakes, muffins, cheesecakes, snack bars, waffles and cookies. Fillings are available in different kinds of textures, colors and flavors and add immediate irresistible appeal to the bakery product. Most frequently used fillings are fruit fillings, chocolate fillings and cream-like fillings. Though, besides being appealing to the eye and mouth, fillings and/or the methods of filling need to fulfill certain requirements such as being easy-to-use, leaving no hollow spaces, having a good bake stability, having an appropriate shelf-live, etc. in order to assure that the obtained result is reproducible.

The most common method to obtain baked products with fillings, for example cakes, is to inject/deposit the filling into the dough/batter before baking or inject/deposit the filling into the baked product after baking. This conventional approach requires always important investments and additional space for industrial and semi industrial bakeries, as an injector, a depositor or an extruder is needed to insert the filling into the baked products. Production costs are increased due to the need of the cleaning of the equipment to meet the food-grade standards. Furthermore there are wastes due to start-ups and stops, additional labor costs etc. Because of this, bakeries often hesitate to differentiate their offer with filled products or decide to postpone the investment needed to enlarge their assortment. Also for artisanal bakeries, lack of skilled labor force and increased time pressure increase the need for simpler processes than the conventional deposit of fillings with a piping bag into the batter.

When bakeries do choose to use the existing filling technologies, they also encounter certain limitations. The current injection methods are limited by the possible number of filling spots (limited number of injection nozzles), by the injectable amount of filling and by the fact that it is difficult to mix flavors, textures and/or colors in the same baked product. This leads, for example, to the presence of a creamy filling in only parts of the baked product and therefore the consumer cannot enjoy a creamy sensation in every bite. On the other hand, if a filling is present in every bite, the filling has no creamy texture and very often dries out and/or moistens the baked product resulting in a reduced microbial stability.

Besides injecting the filling into the dough/batter, there exist (micro)capsules made with hydrocolloids and containing flavor or color. Though, current existing (micro)capsules have limitations in the usage in baked products. Some add moisture to the baked product causing considerable problems concerning physical and microbial stability during processing and storage. Also, the small particles bleed flavor and color into the surrounding bakery product, making the baked product less appealing to the eye and altering the flavor. Others fillings like chocolate chunks, dried fruit pieces, and candied fruit (that would be evenly dispersed and present in every bite) have no creamy texture and dry out baked products. Another example are soft, impervious bodies unaffected by temperatures of the range generally met within cooking cakes. Though, these bodies are limited to colored and fruitlike fillings and are not homogeneous in size. Moreover, the bodies have a rather liquid core-solution and a relative solid outer shell, which provides an unpleasant feeling in the mouth when eaten.

It is an object of the present invention to provide bakers with new and improved tools, methods and products that overcome the problems encountered with the above mentioned methods for providing fillings into baked products.

SUMMARY OF THE INVENTION

It is an object of the present invention to provide bakers with new tools, being diverse in composition, resistant to the mixing and baking steps and physical and microbial stable during storage and methods using those tools, which will allow them to provide to the consumer new baked products with new appearances and new taste sensations that keep their properties and quality during the shelf life of the product.

A first aspect of the present invention is directed to a food product comprising (intact) beads, said beads comprising an ingredients mixture comprising
   a) sugar or combination of two or more sugars in an amount between 20% and 75% (dry weight/mixture weight);
   b) starch(es) and/or modified starch(es) or combinations thereof in an amount between 0.5% and 10.0% (dry weight/mixture weight);
   c) food grade hydrocolloid or combination of two or more food grade hydrocolloids in an amount between 0.5% and 3% (dry weight/mixture weight) or food grade di- and/or di- and/or trivalent cations in an amount between 0.5% and 3% (dry weight/mixture weight);
   d) optionally additional ingredients such as eggs or egg derivatives, thickeners, fruits, chocolate, cocoa powder, dairy ingredients, fats, emulsifiers, salts, acids, preservatives, coloring agents and/or flavoring agents in amount(s) between 0 and 75% (dry weight/mixture weight); and;
   e) water up to 100%
wherein said ingredient mixture has a viscosity of at least 10000 cP and at the most 300000 cP; and wherein said beads have a water activity between 0.50 and 0.99, particularly between 0.70 and 0.95, and a Brix index between 20 and 80.

In particular embodiments, the food product as described herein comprises (intact) beads having a symmetric and homogeneous particle shape such as cubic, spherical, cylindrical; preferably spherical; and wherein the characterizing average diameter of the beads ranges between 2 mm and 20 mm.

In particular embodiments, the food product as described herein provides that said food grade hydrocolloid is chosen from alginate or pectin or the food grade di- and/or di- and/or trivalent cations are chosen from $Ca^{2+}$, $Ba^{2+}$, $Fe^{2+}$, $Sr^{2+}$, $Mg^{2+}$, $Mn^{2+}$ or $Al^{3+}$.

In particular embodiments, the food product as described herein provides that said sugar is chosen from sucrose, glucose, dextrose, fructose, invert sugar or glucose syrup.

In particular embodiments, the food product as described herein provides that said dairy ingredients are chosen from sweetened condensed skimmed milk, plain milk, milk powder, butter or cream; wherein said eggs are chosen from fresh eggs, dried eggs or egg fractions such as egg yolk and/or egg white; wherein said thickeners are chosen from cellulose or xanthan gum; wherein said emulsifiers are chosen from mono- and diglycerides of fatty acids or sucrose esters of fatty acids; wherein said acids are chosen from tartaric acid, citric acid or glucono delta lactone; wherein said preservative is potassium sorbate; and/or wherein said coloring agents are beta-carotene or titanium dioxide.

In a further aspect, the present invention relates to the use of the food product according to the present invention in bakery applications and in particular in baked products.

In a further aspect, the present invention relates to a dough or batter comprising the food product according to the present invention.

In a further aspect, the present invention also relates to a baked product comprising the food product according to the present invention.

In particular embodiments, the baked product according to the present invention comprises at least 90% (weight of recovered beads/initial weight of the beads) of the beads as described herein added before baking.

In further particular embodiments, the water activity of the crumb of the baked product and of the beads according to the present invention differs by at most 10%, preferably at most 5%.

In a further aspect, present invention is also directed to a method for preparing a food product comprising beads as described herein, said method comprising the steps of a) preparing a mixture of ingredients comprising sugar or combination of two or more sugars, starch(es) and/or modified starch(es), water, and one or more food grade hydrocolloids or one or more food grade di- and/or di- and/or trivalent cations; said ingredient mixture having a viscosity of at least 10000 and at the most 300000 cP;

b) generating drops of said ingredients mixture;

c) contacting said drops with a solution containing di- and/or trivalent cations in a concentration of at least 5 and at most 50 mg/g or with a solution containing food grade hydrocolloid(s) in a concentration of at least 5 and at most 50 mg/g, with the proviso that when hydrocolloid(s) are used in the mixture of ingredients a solution containing di- and/or trivalent cations is used and when di- and/or trivalent cations are used in the mixture of ingredients a solution comprising food grade hydrocolloid(s) is used; said solution optionally comprising an osmotic pressure generating component; and;

d) optionally rinsing the obtained beads.

In particular embodiments, step (b) of the method according to the present invention is performed by cutting a flow of the ingredients with the aid of a cutting device, preferably rotating wires.

In particular embodiments, the food grade hydrocolloid used in the method according to the present invention is chosen from alginate or pectin; and wherein the food grade cations are chosen from $Ca^{2+}$, $Ba^{2+}$, $Fe^{2+}$, $Sr^{2+}$, $Mg^{2+}$, $Mn^{2+}$, $Al^{3+}$ preferably under the form of $CaCl_2$, $CaCl_2 \cdot 2H_2O$, calcium iodate, calcium lactate, $CaSO_4$, calcium propionate, iron oxalate.

In particular embodiments, in step (c) and/or (d) of the method according to the present invention the solution contains an osmotic pressure generating component such as salt, glycerol, invert sugar, glucose or sucrose, alone or in combination. Preferably the solution contains at least 500 mg/g sucrose and at the most 650 mg/g sucrose. Preferably the water activity of the solution differs from the water activity of the ingredient mixture or of the beads by at most 10%, preferably by at most 5%. Preferably, the solution of both step (c) and step (d), contains an osmotic pressure generating component, preferably the same osmotic pressure generating component, preferably at the same concentration.

In a further aspect, present invention also relates to a method for preparing a dough or batter comprising the step of adding to the dough or batter the food product as described herein.

In a further aspect, present invention also provides a method for preparing a baked product comprising a step of adding to the dough or batter the food product as described herein and baking said dough or batter.

These and further aspects and embodiments are described in the following sections and in the claims.

DETAILED DESCRIPTION OF THE INVENTION

Figure 1:
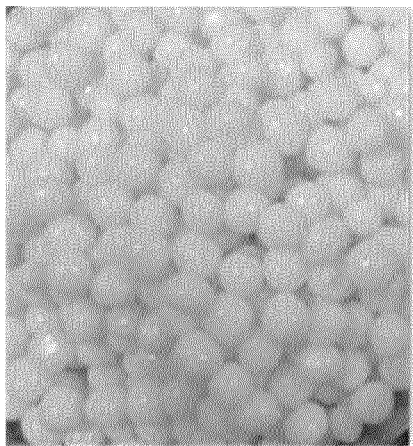
FIG. 1 shows a food product according to the present invention.

Before the present compositions, methods, uses, and baked products used in the invention are described, it is to be understood that this invention is not limited to particular compositions, methods, uses, and baked products, described, as such compositions, methods, uses, and baked products may, of course, vary. It is also to be understood that the terminology used herein is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any products, uses thereof and methods similar or equivalent to those described herein may be used in the practice or testing of the present invention, the preferred products, uses thereof, and methods are now described.

In this specification and the appended claims, the singular forms "a", "an", and "the" include plural references unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The terms "comprising", "comprises" and "comprised of" also include the term "consisting of".

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The term "between" as used herein when referring to a measurable value such as a parameter, an amount, a temporal duration, is synonymous with "intermediate", is meant to indicate the beginning and ending points of a group of numbers, a range of measurement.

It is to be understood that the values to which the modifier "between" refers are themselves also specifically, and preferably, disclosed and included in the range.

The recitation of numerical ranges by endpoints includes all numbers and fractions subsumed within the respective ranges, as well as the recited endpoints.

Unless specified otherwise, all viscosity values (expressed in cP (mPa·s)) disclosed herein refer to viscosities measured at 65° C.

The present invention relates to edible fillings, typically for bakery and patisserie products, in the shape of homogenous beads, the use of such beads and their methods of production. The viscosity of the ingredient mixture of which the beads are composed and the water activity and Brix index of the beads themselves are concerted in a way that the final result prevents adding or retaining moisture to/from the bakery or patisserie product and at the same time provides an excellent mechanical resistance in conventional dough and batter mixing systems, an excellent resistance when baked in a dough or a batter, an excellent taste and an excellent perception in the mouth when eating the beads. As a result of the excellent mechanical resistance, said beads remain intact during the process of mixing and baking. Accordingly, said beads are visible, preferably individually distinguishable, at each time point during the preparation process of the food product and/or more than 90% of (whole intact) beads, preferably more than 95% of (whole intact) beads can be recovered after mixing the dough or batter and/or after baking thereof (calculated as the weight of recovered beads/initial weight of the beads).

Said beads allow the preparation of very appealing filling-containing baked products. The use of said beads gives baked products wherein the filling is homogeneously distributed within the crumb. By eating a portion of the filling at each bite, consumers testing such baked products experience new and very pleasant sensations. When the baked product is a multi-layered product, the use of said beads may give baked products wherein the filling is homogeneously distributed within the crumb of at least one of the layers of said baked product.

In a first aspect, the present invention relates to a food product comprising (intact)beads, said beads comprising an ingredients mixture comprising:
a) sugar or combination of two or more sugars in an amount between 20% and 75% (dry weight/mixture weight), preferably between 45% and 75% w/w or between 20% and 65% w/w, more preferably between 45% and 65% w/w, such as for instance 20% w/w, 25% w/w, 30% w/w, 35% w/w, 40% w/w, 45% w/w, 50% w/w, 55% w/w, 60% w/w, 65% w/w, 70% w/w or 75% w/w;
b) starch(es) and/or modified starch(es) or combinations thereof in an amount between 0.5% and 10.0% (dry weight/mixture weight);
c) food grade hydrocolloid or combination of two or more food grade hydrocolloids in an amount between 0.5% and 3% (dry weight/mixture weight) or food grade di- and/or trivalent cations in an amount between 0.5% and 3% (dry weight/mixture weight);
d) optionally additional ingredients such as eggs or egg derivates, thickeners, fruits, chocolate, cocoa powder, dairy ingredients, fats, emulsifiers, salts, acids, preservatives, coloring agents and/or flavoring agents in amount(s) between 0 and 75% (dry weight/mixture weight); and;
e) water up to 100% wherein said ingredient mixture has a viscosity of at least 10000 cP and at the most 300000 cP, preferably between 50000 cP and 100000 cP; and wherein said beads have a water activity between 0.50 and 0.99, preferably between 0.6 and 0.95, more preferably between 0.70 and 0.95 and a Brix index between 20 and 80, preferably between 45 and 75.

In a particular embodiment, the present invention relates to a food product comprising (intact) beads, said beads comprising an ingredients mixture comprising:
a) sugar or combination of two or more sugars in an amount between 20% and 75% (dry weight/mixture weight);
b) starch(es) and/or modified starch(es) or combinations thereof in an amount between 0.5% and 10.0% (dry weight/mixture weight);
c) food grade hydrocolloid or combination of two or more food grade hydrocolloids in an amount between 0.5% and 3% (dry weight/mixture weight);
d) optionally additional ingredients such as eggs or egg derivates, thickeners, fruits, chocolate, cocoa powder, dairy ingredients, fats, emulsifiers, salts, acids, preservatives, coloring agents and/or flavoring agents in amount(s) between 0 and 75% (dry weight/mixture weight); and;
e) water up to 100% wherein said ingredient mixture has a viscosity of at least 10000 cP and at the most 300000 cP; and wherein said beads have a water activity between 0.50 and 0.99 and a Brix index between 20 and 80.

In a particular embodiment, the present invention relates to a food product comprising (intact) beads, said beads comprising an ingredients mixture comprising:
a) sugar or combination of two or more sugars in an amount between 20% and 75% (dry weight/mixture weight);
b) starch(es) and/or modified starch(es) or combinations thereof in an amount between 0.5% and 10.0% (dry weight/mixture weight);
c) food grade di- and/or trivalent cations in an amount between 0.5% and 3% (dry weight/mixture weight);

d) optionally additional ingredients such as eggs or egg derivates, thickeners, fruits, chocolate, cocoa powder, dairy ingredients, fats, emulsifiers, salts, acids, preservatives, coloring agents and/or flavoring agents in amount(s) between 0 and 75% (dry weight/mixture weight); and;
e) water up to 100% wherein said ingredient mixture has a viscosity of at least 10000 cP and at the most 300000 cP; and wherein said beads have a water activity between 0.50 and 0.99 and a Brix index between 20 and 80.

The term "food product" as used herein refers to its broadest meaning, and particularly denotes edible products which are considered typically fillings for baked products, particularly, but not limited to, cream, fruit, chocolate, nuts and food grade coloring and flavoring agents. In particular, all edible filling ingredients known by the skilled artisan may be used as ingredients in said food product.

In the context of present invention, the term "bead" as used herein is synonymous with "particle" and refers to a small object or drop of fluid having a certain shape, preferably symmetric and homogeneous, comprising cubic, sphere and cylinder; preferably sphere. The beads are preferably intact, meaning that the beads retain for at least 90%, preferably for at least 95% its original shape during, for instance, the handling, the mixing, or the baking of the beads.

In particular embodiments, the (intact) beads as described herein have a size, when spherical, comprised between 2 and 20 mm, preferably between 5 and 15 mm, more preferably between 7 and 9 mm.

The term "size" as described herein refers to the external diameter of the beads according to the invention. The beads as described herein can achieve a larger diameter compared to the prior art. The large size reduces the interaction surface of said bead with the matrix of the baked goods and therefore reduces the bleeding of ingredients into said baked good.

In particular embodiments, the (intact) beads as described herein have a homogeneous size distribution with a standard deviation normalized on average of an at random taken population of at least 40 beads lower than 20%, preferably lower than 10%.

The term "homogeneous size distribution" refers herein to uniform physical magnitude. The (intact) beads according to the invention have a remarkable homogeneous size distribution. Said homogeneous size distribution improves the distribution of said beads into said bakery product and this results in an equal amount of filling in every bite.

In particular embodiments, the (intact) beads as described herein have a water activity comprised between 0.50 and 0.99, preferably between 0.6 and 0.95, more preferably between 0.70 and 0.95. Said range of water activity close to the water activity of the baked products reduces or prohibits the beads according to present invention to release moisture to the baked product including said beads and therefore improves the microbial stability of said baked product during processing and storage.

The term "water activity" as used herein refers to the ratio of the water-vapour pressure in the foodstuff to the vapour pressure of pure water at the same temperature. A water activity of 0.80 means the vapor pressure is 80 percent of that of pure water. Said water activity is typically measured following the principles and requirements of ISO 21807:2004. The water activity of the beads used herein is comprised between 0.50 and 0.99, preferably between 0.6 and 0.95, more preferably between 0.70 and 0.95.

In particular embodiments, the (intact) beads as described herein have a Brix comprised between 20 and 80, preferably between 45 and 75. The Brix index is related to the amount of sugar in the fluid. The amount of sugar has a large influence on the water activity of the beads according to present invention, as it can act as an osmotic pressure generating component. The Brix activity according to present invention improves the water activity and thus the shelf life.

The term "Brix" or "Brix index" or derivatives hereof as used herein refers to a measure of sugar concentration and is typically measured using a refractometer in line with the ISO standards. In said measurement, a drop of fluid is placed on a quartz surface at one end of the instrument, the sugar in the fluid leads to bending of the light at a certain angle, depending on the quantity and said refractometer measures this angle and compares it to a scale corresponding the quantity of dissolved sugar in the mixture. One degree Brix corresponds with 1 gram of sucrose in 100 grams of solution and represents the strength of the solution as percentage by mass. If the solution contains dissolved solids other than pure sucrose, then the Brix only approximates the dissolved solid content. The Brix as used herein is comprised between 20 and 80, preferably between 45 and 75. Alternatively the Brix of a product may be estimated/calculated based on the product composition using conversion tables.

The constituents of the ingredients mixture used in the beads as described herein are preferably ingredients that are commonly used to prepare fillings for baked products. Typical ingredient mixtures comprise:
- sugar(s) in amount(s) between 20 and 75% w/w, preferably between 45 and 75% w/w or between 20% and 65% w/w, more preferably between 45% and 65% w/w, such as for instance 20% w/w, 25% w/w, 30% w/w, 35% w/w, 40% w/w, 45% w/w, 50% w/w, 55% w/w, 60% w/w, 65% w/w, 70% w/w or 75% w/w.
- starch and/or modified starch in an amount between 0.5 and 10% w/w.
- additional ingredients such as eggs or egg derivatives; thickener(s) in amount(s) between 0.01 and 5% w/w, preferably in an amount between 0.1 and 0.3%; fruits; chocolate; cocoa powder; dairy ingredients; vanilla extract(s); fats preferably in an amount between 1 and 5%; emulsifiers preferably in an amount between 0.05 and 0.1%; salts preferably in an amount between 0.1 and 0.3%; acids; preservatives; colouring agents and flavouring agents; wherein the total of additional ingredients is between 0 and 75% w/w.

In particular embodiments, the ingredient mixture as described herein comprises sugar, such as sucrose, glucose syrup and/or invert sugar, in an amount between 20 and 65% (dry weight sugar/mixture weight), preferably between 20 and 60%, more preferably between 40 and 60%.

In particular embodiments, the ingredient mixture as described herein comprises starch in an amount between 1 and 8% (w/mixture weight).

In particular embodiments, the ingredient mixture as described herein comprises thickeners such as cellulose, microcrystalline cellulose, carboxymethyl cellulose or xanthan, in an amount between 0.1 and 1% (w/mixture weight).

In particular embodiments, the ingredient mixture as described herein comprises salt in an amount between 0.1 and 0.3% (w/mixture weight).

In particular embodiments, the ingredient mixture as described herein comprises fat in an amount between 1 and 5% (w/mixture weight).

In particular embodiments, the ingredient mixture as described herein comprises emulsifier, such as mono- and diglycerides of fatty acids or sucrose esters of fatty acids in an amount between 0.05 and 0.1% (w/mixture weight).

In particular embodiments, the ingredient mixture as described herein comprises hydrocolloid, such as alginate or pectin, in an amount between 0.5 and 3% (w/mixture weight).

In particular embodiments, the ingredient mixture as described herein comprises water up to 100%.

Preferably, the ingredient mixture as described herein also comprises flavouring agents, colouring agents and/or preservatives.

In particular embodiments, the ingredients mixture as described herein has a viscosity comprised between 10000 and 300000 cP, preferably between 50000 and 100000 cP; a water activity comprised between 0.5 and 0.99 preferably between 0.6 and 0.95; a Brix between 20 and 80, preferably between 45 and 75.

In a particular embodiment, the ingredients mixture as described herein has a viscosity comprised between 50000 and 100000 cP; a water activity comprised between 0.6 and 0.95; and; a Brix between 45 and 75.

The term "sugar" and the phrase "sugar or combination of two or more sugars" as used herein may refer to any sugar or sugars combination suitable for filling applications. There are various types of sugar, including simple sugars, such as monosaccharides and disaccharides, and longer chains of sugars, called oligosaccharides. Sugars are preferably mono- and/or disaccharides.

In particular embodiments, sugar as used herein is chosen from sucrose, glucose, dextrose, fructose, invert sugar and/or glucose syrup.

The term "starch" or "modified starch" as used herein may refer to any starch or combinations thereof well known by the skilled artisan. Non-limiting examples include flour, corn starch, and/or potato starch. Examples of starch modifications include physical, enzymatical and chemical modifications.

The term "hydrocolloid" or "food grade hydrocolloid" or derivatives hereof as used herein refers to any edible colloid system wherein the colloid particles are hydrophilic polymers dispersed in water. The hydrocolloid, when added in the ingredient mixture or solution, may be any hydrocolloid capable of gelling in the presence of one or more of a divalent or a trivalent cation. Preferred hydrocolloids are alginates and pectin. More preferred hydrocolloids are alginates. The amount of hydrocolloid in the ingredient mixture is preferably between 5 and 50 mg/g, more preferably between 7 and 20 mg/g. The amount of hydrocolloid, when added in the solution, is preferably between 5 and 50 mg/g.

The term "cation" as used herein may be any cation suitable for inducing the gelling of a hydrocolloid when added to the ingredient mixture or solution. Cations are preferably food grade divalent or trivalent cations. The divalent cation(s), preferably chosen from $Ca^{2+}$, $Ba^{2+}$, $Fe^{2+}$, $Mn^{2+}$, $Mg^{2+}$ and $Sr^{2+}$, most preferably $Ca^{2+}$, or trivalent cation(s), preferably $Al^{3+}$; may be present under any suitable (inorganic or organic) form such as $CaCl_2$, $CaCl_2 \cdot 2H_2O$, calcium iodate, calcium lactate, $CaSO_4$, calcium propionate and iron oxalate, preferably $CaCl_2$ and $CaCl_2 \cdot 2H_2O$. The amount of calcium ions in the ingredient mixture expressed as $CaCl_2$ on weight basis is preferably between 5 and 50 mg/g, more preferably between 7 and 20 mg/g. The amount of calcium ions, when added to the solution and expressed as $CaCl_2$ on weight basis, is preferably between 5 and 50 mg/g, more preferably between 7 and 20 mg/g.

The term "eggs" or "egg derivates" or derivatives hereof as used herein refer to fresh eggs or dried eggs or to eggs fractions such as, but not limited to, egg yolk and/or egg white.

The term "dairy" or "dairy ingredient" or derivatives thereof as used herein generally refers to any food product produced from milk of mammals, preferably any dairy ingredient well known by the skilled artisan.

In particular embodiments, said dairy ingredients are chosen from sweetened condensed skimmed milk, plain milk, milk powder, butter and/or cream;

The term "fat" as used herein refers to any food grade fat well known by the skilled artisan. For example, butter, margarine and/or rapeseed oil.

The term "emulsifier" as used herein refers to any agent that forms or preserves an emulsion, preferably, any emulsifier well known by the skilled artisan.

In particular embodiments, said emulsifier or emulsifiers is/are chosen from mono- and diglycerides of fatty acids and/or sucrose esters of fatty acids.

The term "salts" as used herein refers to any food grade salt well known by the skilled artisan such as for example, but not limited to sodium chloride.

The term "thickener" as used herein refers to any food grade thickener well known by the skilled artisan such as for example food grade thickeners found between references E400 and E499 as described in the European-based naming system for food additives (INS—International Naming System for food additives). In particular embodiments, said thickener is chosen from cellulose (E460) and/or xanthan gum (E415).

The term "acid" as used herein generally refers generally to a chemical substance whose aqueous solutions have a pH of less than 7, the ability to react with bases and certain metals to form salts and are characterized by a sour taste. Said acids are preferably food grade acids or acidity regulators well known by the skilled artisan, such as for example, sodium lactate (E325), calcium lactate (E327), citric acid (E330), tartaric acid (E334) and/or glucono delta lactone (E575).

In particular embodiments, said acids are chosen from tartaric acid (E334), citric acid (E330) and/or glucono delta lactone (E575).

The term "preservative" as used herein refers to any food grade preservative well known by the skilled artisan such as for example food additives E200 to E299. In particular embodiments, said preservative is potassium sorbate (E202).

The term "coloring agent" or derivatives hereof as used herein, refers to any food grade coloring agent to color food products known by the skilled artisan such as for example the food additives E100 to E199. In particular embodiments, said coloring agent is beta-carotene (E160a) and/or titanium dioxide (E171).

The term "flavoring agent" or derivatives hereof as used herein, refers to any food grade flavoring agent to flavour food products well known by the skilled artisan.

The term "viscosity" as used herein refers to a measure of resistance of a fluid which is being deformed by either shear stress or tensile stress. Said viscosity is typically measured using a viscometer at 65° C. and in line with the ASTM standards. Said viscosity is expressed in the metric unit centiPoise (cP (mPa·s)).

The present invention also relates to the use of the food product according to the present invention in bakery applications and in particular in baked products. The use of the beads according to the invention in bakery applications allows the preparation of very appealing filling-containing baked products. The use of said beads gives baked products wherein the filling is homogeneously distributed within the crumb. By eating a portion of the filling at each bite, consumers testing such baked products experience new and very pleasant sensations.

As intended herein, the phrase "use of the food product" particularly denotes handling or applying said food product in any manner well known by the skilled artisan and preferably, in baked products.

The present invention also relates to a dough or batter comprising the food product according to present invention.

In particular embodiments, the dough or batter according to present invention contains homogeneous (intact) beads of filling as described herein having
- a water activity comprised between 0.50 and 0.99, preferably between 0.6 and 0.95, more preferably between 0.70 and 0.95;
- a Brix comprised between 20 and 80, preferably between 45 and 75;

The food product according to the present invention provides in an excellent mechanical resistance in conventional dough and batter mixing systems. Also, no bleeding of ingredient and/or flavour into the dough or batter is observed and there is no loss of flavour or texture of the baked products.

In particular embodiments, the dough or batter according to present invention contains homogeneous (intact) beads of filling as described herein having a symmetric and homogeneous particle shape such as cubic beads, spherical beads, cylindrical beads, preferably spherical beads.

In particular embodiments, the dough or batter according to the present invention contains homogeneous (intact) beads of filling as described herein having a size, when spherical, comprised between 2 and 20 mm, preferably between 5 and 15 mm, more preferably between 7 and 9 mm.

In particular embodiments, the dough or batter according to the present invention contains homogeneous (intact) beads of filling as described herein having a homogeneous size distribution with a standard deviation normalized on average of an at random taken population of at least 40 beads (called hereafter relative standard deviation or RSD), lower than 20%, preferably lower than 10%;

In particular embodiments, the dough or batter according to the present invention contains homogeneous (intact) beads of filling as described herein in an amount between 150 and 350 g per kg batter, preferably in an amount between 200 and 300 g per kg of batter.

The present invention also relates to a baked product comprising the food product according to present invention. Said baked product may be any type of baked product known by a skilled artisan, preferably where the presence of a filling is desirable. Examples of particularly suited baked products are breads, toast breads, brioches, buns, panettone, donuts, cakes, steam cakes, cream cakes, sponge cakes, muffins, cheesecakes, snack bars, waffles and cookies. Preferred baked products are cakes and muffins.

In particular embodiments, said baked product comprises at least 75%, preferably at least 80%, more preferably at least 85%, even more preferably at least 90%, most preferably more than 95% of the beads according to the invention added before baking (calculated as the weight of recovered beads/initial weight of the beads). This shows that the food product according to the present invention provides in beads having a good mechanical resistance allowing the processing of the food product in conventional dough and batter mixing systems. Also, the product shows very good resistance to the baking conditions.

In particular embodiments, the baked product according to the present invention contains homogeneous (intact) beads of filling as described herein having a water activity comprised between 0.50 and 0.99, preferably between 0.6 and 0.95, more preferably between 0.70 and 0.95; and a Brix comprised between 20 and 80, preferably between 45 and 75.

In particular embodiments, the homogeneous beads of filling as described herein have a symmetric and homogeneous particle shape such as cubic beads, spherical beads, cylindrical beads, and preferably spherical beads.

In particular embodiments, the homogeneous beads of filling as described herein have a size, when spherical, comprised between 2 and 20 mm, preferably between 5 and 15 mm, more preferably between 7 and 9 mm.

In particular embodiments, the homogeneous beads of filling as described herein have a homogeneous size distribution with a standard deviation normalized on average of an at random taken population of at least 40 beads (called hereafter relative standard deviation or RSD), lower than 20%, preferably lower than 10%.

In further particular embodiments, the water activity of the crumb of the baked product and of the (intact) beads according to present invention differs by at most 30%, preferably 20%, more preferably 10% and most preferably by at most 5%. Said small difference in water activity reduces or prohibits the beads according to present invention to add moisture to the baked product containing said beads or to remove water from the baked product containing said beads. Therefore the baked products containing said beads keep their texture and organoleptic properties for a prolonged period (no drying out or moistening of the product). Furthermore it improves the microbial stability of said baked product during processing and storage.

The term 'crumb' as used herein refers to the soft inner portion of said baked product.

The present invention is further directed to a method for preparing a food product comprising (intact) beads as described herein, said method comprising the steps of
a) preparing a mixture of ingredients comprising sugar or combination of two or more sugars, starch(es) and/or modified starch(es), water, and one or more food grade hydrocolloids or one or more food grade di- and/or trivalent cations; said ingredient mixture having a viscosity of at least 10000 cP and at the most 300000 cP;
b) generating drops of said ingredients mixture;
c) contacting said drops with a solution containing di- and/or trivalent cations in a concentration of at least 5 and at most 50 mg/g or with a solution containing food grade hydrocolloid(s) in a concentration of at least 5 and at most 50 mg/g, with the proviso that when hydrocolloid(s) are used in the mixture of ingredients a solution containing di- and/or trivalent cations is used and when di- and/or trivalent cations are used in the mixture of ingredients a solution comprising food grade hydrocolloid(s) is used; said solution optionally comprising an osmotic pressure generating component; and;
d) optionally rinsing the obtained beads.

This method allows obtaining beads with a homogeneous size distribution with a standard deviation normalized on average of an at random taken population of at least 40 beads lower than 20%, preferably lower than 10%.

In a particular embodiment, the present invention relates to a method for preparing a food product comprising (intact) beads as described herein, said method comprising the steps of:

a) preparing a mixture of ingredients comprising sugar or combination of two or more sugars, starch(es) and/or modified starch(es), water, and one or more food grade hydrocolloids; said ingredient mixture having a viscosity of at least 10000 cP and at the most 300000 cP;
b) generating drops of said ingredients mixture;
c) contacting said drops with a solution containing di- and/or trivalent cations in a concentration of at least 5 and at most 50 mg/g; said solution optionally comprising an osmotic pressure generating component; and;
d) optionally rinsing the obtained beads.

In particular embodiments, said hydrocolloid may be any hydrocolloid capable of gelling in the presence of one or more of a divalent or a trivalent cation. Preferred hydrocolloids are alginates and pectin. More preferred hydrocolloids are alginates. The amount of hydrocolloid in the ingredient mixture is preferably between 5 and 50 mg/g, more preferably between 7 and 20 mg/g. The divalent cation(s), for example $Ca^{2+}$, $Ba^{2+}$, $Fe^{2+}Mn^{2+}$, $Mg^{2+}$ or $Sr^{2+}$, or trivalent cation(s), for example $Al^{3+}$, may be any cation suitable for inducing the gelling of an hydrocolloid, preferably, $Ca^{2+}$. Said cation may be present under any suitable (inorganic or organic) form, such as $CaCl_2$, $CaCl_2 \cdot 2H_2O$, calcium iodate, calcium lactate, $CaSO_4$, calcium propionate and iron oxalate, preferably, calcium chlorides, more preferably, $CaCl_2$ and $CaCl_2 \cdot 2H_2O$. The amount of calcium ions in the solution as described herein expressed as $CaCl_2$ on weight basis is preferably between 5 and 50 mg/g, more preferably between 7 and 20 mg/g.

In a particular embodiment, the present invention relates to a method for preparing a food product comprising (intact) beads as described herein, said method comprising the steps of:

a) preparing a mixture of ingredients comprising sugar or combination of two or more sugars, starch(es) and/or modified starch(es), water, and one or more food grade di- and/or trivalent cations; said ingredient mixture having a viscosity of at least 10000 cP and at the most 300000 cP;
b) generating drops of said ingredients mixture;
c) contacting said drops with a solution containing food grade hydrocolloid(s) in a concentration of at least 5 and at most 50 mg/g; said solution optionally comprising an osmotic pressure generating component; and;
d) optionally rinsing the obtained beads.

In particular embodiments said hydrocolloid may be any hydrocolloid capable of gelling in the presence of one or more of a divalent or a trivalent cation. Preferred hydrocolloids are alginates and pectin. More preferred hydrocolloids are alginates. The amount of hydrocolloid in said solution is preferably between 5 and 50 mg/g. The divalent cation(s), for example $Ca^{2+}$, $Ba^{2+}$, $Fe^{2+}$ and $Sr^{2+}$, or trivalent cation(s), for example $Al^{3+}$, may be any cation suitable for inducing the gelling of an hydrocolloid, preferably, $Ca^{2+}$. Said cation may be present under any suitable (inorganic or organic) form, such as $CaCl_2$, $CaCl_2 \cdot 2H_2O$, calcium iodate, calcium lactate, $CaSO_4$, calcium propionate and iron oxalate, preferably, calcium chlorides, more preferably, $CaCl_2$ and $CaCl_2 \cdot 2H_2O$. The amount of calcium ions in the ingredient mixture as described herein expressed as $CaCl_2$ on weight basis is preferably between 5 and 50 mg/g, more preferably between 7 and 20 mg/g.

As intended herein, the phrase "preparing a mixture" particularly denotes blending or combining different ingredients into one mass or mixture. The mixing of the ingredients may be performed using any suitable equipment. Typically all ingredients are put together in a container and mixed either manually or with the aid of a mixing device. The sequence of addition of the different ingredients as well as the temperature(s) at which the mixing steps should be performed are parameters well known by the skilled artisan.

In particular embodiments, the hydrocolloid according to the invention, when added to the mixture, is dissolved in water before being mixed to the rest of the ingredients.

In particular embodiments, the ingredients mixture as described herein has a viscosity comprised between 10000 and 300000 cP, preferably between 50000 and 100000 cP. No or almost no increase or decrease in viscosity is observed (based on the mouth feeling when eating the beads) after contacting drops of said ingredients mixture with a solution containing di- and/or trivalent cations in a concentration of at least 5 and at most 50 mg/g or with a solution containing food grade hydrocolloid(s) in a concentration of at least 5 and at most 50 mg/g, said solution optionally comprising an osmotic pressure generating component. The main viscosity of the obtained beads of filling is proper to the ingredients mixture (filling) itself. As a result hereof, the perception of the filling texture and the taste remains the same in beads of filling as in the original ingredients mixture (filling) (i.e. the ingredients mixture before formation of the beads).

As intended herein, the phrase "generating drops" particularly denotes creating a small quantity of fluid by allowing or forcing the mixture of ingredients to fall. Preferably, said drops are formed by forcing the mixture through a cylindrical device such as a tube, a needle or a nozzle, more particularly said drops are formed through extrusion. Preferably, the internal diameter of the device is between 1 and 20 mm, more preferably between 3 and 10 mm, even more preferably about 5 mm. At the exit of the cylindrical device the drops may be formed in several ways. For example, the drops may be formed by natural gravity, by vibration, by ultrasound, by laser cutting, by electrostatic enhanced dripping or by means of a cutting device such as a spinning disk, a rotating cutting jet, cutting surfaces or rotating cutting wires. Preferably the drops are formed by vibration, by ultrasound, by laser cutting, by electrostatic enhanced dripping or by mean of a cutting device such as a spinning disk, a rotating cutting jet, cutting surfaces or rotating cutting wires.

The term "osmotic pressure generating component" refers to an element that has the ability to create a pressure exerted by the flow of water through a semipermeable membrane separating two solutions with different concentrations of solute. Preferably, the osmotic pressure generating component as used herein is chosen from NaCl, $NH_4Cl$, polyols such as glycerol or sorbitol and/or carbohydrates such as starch, dextrins, glucose or sucrose. More preferably the osmotic pressure generating component is a sugar, preferably sucrose, more preferably sucrose in a concentration between 100 and 650 g/kg, even more preferably sucrose in a concentration between 300 and 650 g/kg.

In particular embodiments the solution containing the osmotic pressure generating component has a water activity that differs from the water activity of the ingredient mixture or of the beads by at most 10%, preferably by at most 5%.

In particular embodiments, step (c) and/or step (d) of the method according to present invention is performed in a solution containing an osmotic pressure generating component as described above. Preferably both step (c) and step (d)

are performed in a solution containing an osmotic pressure generating component. Preferably said component is the same in steps (c) and in step (d), more preferably at the same concentration.

Preferably the solution is a sucrose solution of at least 500 mg/g and at the most 650 mg/g.

In particular embodiments, step (b) of said method according to present invention is performed by cutting a flow of the ingredients with the aid of a cutting device, preferably rotating wires. An example of said suitable cutting system, based on rotating cutting wires, may be described in the following way:

- a rotating disk with a diameter of 50 mm and having at its circumference 1 to 6 perpendicular wires of 30 mm length and 1 mm diameter is attached to the shaft of a motor;
- nozzles with an internal diameter of about 5 mm are positioned just above the cutting wires (about 1 mm or less);
- the ingredient mixture is passed though the nozzles with a pressure between 5 and 200 psi; and;
- the stator (rotating disk) rotates at a speed between 10 and 1000 rpm.

A skilled person will understand that the jet cutting system parameters (number and size of wires, nozzles diameters, ingredient mixture, extrusion pressure, stator rotation speed, . . . ) may be adjusted to accommodate the ingredient mixture properties (viscosity, composition, . . . ) and the desired filling beads specifications (shape, diameter, . . . ).

As intended herein, the phrase "contacting said drops with a solution" as used herein particularly denotes bringing the drops according to the invention in immediate proximity with a solution.

In particular embodiments, the food grade hydrocolloid used in the method according to the present invention is chosen from alginate and/or pectin.

In particular embodiments, the food grade cations used in the method according to present invention are chosen from $Ca^{2+}$, $Ba^{2+}$, $Fe^{2+}$, $Mn^{2+}$, $Mg^{2+}$, $Sr^{2+}$, and/or $Al^{3+}$ preferably under the form of $CaCl_2$, $CaCl_2 \cdot 2H_2O$, calcium iodate, calcium lactate, $CaSO_4$, calcium propionate, and/or iron oxalate.

In particular embodiments, the drops (beads) according to present invention are let in the solution as described herein for a time comprised between 5 min and several hours, preferably between 5 min and 1 hour, more preferably between 10 and 30 min.

The term "rinsing" as used herein refers to the act of washing lightly, preferably, in a solution identical to the dripping solution not containing the calcium source or the hydrocolloid.

In particular embodiments, the rinsing step as described herein, is not optional.

In particular embodiments, the beads obtained by the method according to the invention are ready-to-use homogeneous beads of filling having a water activity comprised between 0.50 and 0.99, preferably between 0.6 and 0.95, more preferably between 0.70 and 0.95 and a Brix comprised between 20 and 80, preferably between 45 and 75.

In particular embodiments, the beads obtained by the method according to the invention are ready-to-use homogeneous beads of filling having a symmetric and homogeneous particle shape such as cubic beads, spherical beads, cylindrical beads, preferably spherical beads.

In particular embodiments, the beads obtained by the method according to the invention are ready-to-use homogeneous beads of filling having a size, when spherical, comprised between 2 and 20 mm, preferably between 5 and 15 mm, more preferably between 7 and 9 mm.

In particular embodiments, the beads obtained by the method according to the invention are ready-to-use homogeneous beads of filling having a homogeneous size distribution with a standard deviation normalized on average of an at random taken population of at least 40 beads, lower than 20%, preferably lower than 10%.

The beads of filling obtained according to the methods of the invention have a remarkable homogeneous size distribution and an excellent mechanical resistance. An homogeneous size distribution is characterized by dimensions of said beads being almost identical for all said beads with a relative standard deviation (RSD) lower than 20%, preferably lower than 10%; an excellent mechanical resistance in conventional dough and batter mixing systems is defined by the ability to recover more than 90% of whole intact beads as used herein, preferably more than 95% of whole intact beads as used herein after baking (calculated as the weight of recovered beads/initial weight of the beads).

Beside the excellent mechanical resistance in conventional dough and batter mixing systems and an excellent resistance when baked in a dough or in a batter the (intact) beads of filling show an excellent taste and an excellent perception in the mouth when eaten.

The present invention also relates to a method for preparing a dough or batter comprising the step of adding to said dough or batter the food product according to the present invention.

The present invention also provides a method for preparing a baked product comprising a step of adding to said dough or batter the food product according to the present invention and baking said dough or batter.

In particular embodiments, the method for preparing a baked product according to present inventions comprises the steps of:

mixing ingredients into the form of a batter or a dough
adding homogenous beads of filling, in an amount between 150 and 350 g per kg batter, preferably in an amount between 200 and 300 g per kg of batter, said beads being characterized by having
  a symmetric and homogeneous particle shape such as cubic beads, spherical beads, cylindrical beads, preferably spherical beads;
  a size, when spherical, comprised between 2 and 20 mm, preferably between 5 and 15 mm, more preferably between 7 and 9 mm;
  an homogeneous size distribution with a standard deviation normalized on average of an at random taken population of at least 40 beads (called hereafter relative standard deviation or RSD), lower than 20%, preferably lower than 10%;
  a water activity comprised between 0.50 and 0.99, preferably between 0.6 and 0.95, more preferably between 0.70 and 0.95;
a Brix comprised between 20 and 80, preferably between 45 and 75;
optionally raising said dough or batter
baking said dough or batter to obtain a baked product The food products according to the present invention prevent adding or retaining moisture to/from the bakery or patisserie product and at the same time provides an excellent mechanical resistance in conventional dough and batter mixing systems, an excellent resistance when baked in a dough or a batter, an excellent taste and an excellent perception in the mouth when eating the beads.

EXAMPLES

Example 1: Beads of Filling Preparation

Vanilla-flavoured fillings were prepared using the ingredients of Table 1.

TABLE 1

| | % (w/w) | | | | |
|---|---|---|---|---|---|
| | 1 | 2 | 3 | 4 | 5 |
| Sugars (sucrose) | 50 | 50 | 50 | 50 | 50 |
| Modified Starch (E1442 (hydroxypropyl distarch phosphate)) | 6.6 | 6.6 | 6.6 | 6.6 | 6.6 |
| Thickeners (E460 (microcrystalline cellulose- - E466 (sodium carboxymethylcellulose) - E415 (xanthan gum)) | 0.5 | 0.5 | 0.5 | 0.4 | 0.5 |
| Flavors (Vanillin) - colours (E171 (titanium oxide) - E160a(i) (beta-carotene)) | 0.4 | 0.4 | 0.4 | 0.4 | 0.4 |
| Salt (NaCl) | 0.2 | 0.2 | 0.2 | 0.2 | 0.2 |
| Acid (E334 (L(+)-tartaric acid)) | 0.04 | 0.04 | 0.04 | 0.04 | 0.04 |
| Fat (palm fat) | 3 | 3 | 3 | 3 | 3 |
| Emulsifier (E473 - sucrose esters of fatty acids)) | 0.08 | 0.08 | 0.08 | 0.08 | 0.08 |
| potassium sorbate (E202) | 0.1 | 0.1 | 0.1 | 0.1 | 0.1 |
| Water | 37.08 | 37.08 | 37.08 | 38.08 | 37.08 |
| Alginate (Algogel 3001, Cargill, Belgium) | 2 | 2 | | 1 | |
| Alginate (Satialgin S60, Cargill, Belgium) | | | 2 | | |
| Pectin ((LM 104 AS-BG, Arles, France) | | | | | 2 |

The ingredients are mixed using the following process:
Add water, modified starch and thickeners to the vessel and disperse properly under high shear.
Add the emulsifier and melted fat to this solution and mix under high shear.
Add the sugars and mix gently.
Heat the mixture until complete gelatinization of the modified starch is reached (approximately 95° C.)
Add the acid, the preservative and the salt. Stir gently.
Cool down until 65° C.
Add colours and flavours
For tests 1, 2 and 3 the alginate under powder form was dissolved in the filling using a KitchenAid robot for 15 minutes at 100 rpm. For tests 4 and 5 the alginate or the pectin was dissolved in water before the mixing with the other filling ingredients.

All fillings have a water activity between 0.88 and 0.90, a Brix between 60 and 62 and a dry matter between 60 and 62%.

The mixture was then extruded, through a 5 mm nozzle (Dosage 2000, France) in a 10 mg/ml calcium chloride solution containing 0 (filling 1), 500 (fillings 2 and 3) or 600 mg/g sucrose (fillings 4 and 5). Beads (particles) were formed by cutting the extrudate from the nozzle by mean of rotating cutting wires into cylindrical segments which then forms beads due to their surface tension. The gelation time was 15 minutes. Afterwards the beads were rinsed in water (test 1 to 3) or in a 600 mg/g sucrose solution (tests 4 & 5) and let stand for 1 h30 at 25° C.

The water activity of the ingredient mixtures, of the beads of filling and of the baked product crumb was measured at 20° C. using a LabSwift-aw device (Novasina, Switzerland). Results are the average of 3 measurements.

The diameter and the size distribution of the beads were measured using the following technique. A sample of beads is put as one layer of well separated beads on a Petri dish placed on a millimetric grid. A picture of the beads is taken and analyzed by the ImageJ software (version IJ1.46R; NIH, US).

Dry matter is determined after drying the beads in an oven at 105° C. for 24 hours.

The Brix content of the beads is determined by a Refractometer model RA-600 (Kyoto electronics).

The properties of the beads are described in Table 2.

TABLE 2

| | beads of filling 1 | beads of filling 2 | beads of filling 3 | beads of filling 4 | beads of filling 5 |
|---|---|---|---|---|---|
| diameter (mm) | 7 | 7.4 | 7.6 | 7.6 | 6.9 |
| Relative Standard deviation (RSD) (%) | 5.52 | 9.25 | 9.01 | 8.24 | 5.30 |
| water activity ($a_w$) | 0.96 | 0.92 | 0.91 | 0.91 | 0.9 |
| dry matter (%) | 41% | 55% | 57% | 63% | 56% |
| Brix | 43 | 53 | 54 | 62 | 61 |

FIG. 1 shows a picture of the beads of filling 4

Example 2: Cakes

Cakes were made using a typical cream cake batter recipe using the ingredients listed in Table 3.

TABLE 3

| in grams | cakeref | cake1 | cake2 | cake3 | cake4 | cake5 |
|---|---|---|---|---|---|---|
| water | 225 | 210 | 210 | 210 | 210 | 210 |
| wheat flour (Brabomills NV, Belgium) | 240 | 230 | 230 | 230 | 230 | 230 |
| pasteurized whole eggs | 350 | 327 | 327 | 327 | 327 | 327 |
| Rapeseed oil | 300 | 280 | 280 | 280 | 280 | 280 |
| Tegral Satin Cream Cake base* (Puratos NV, Belgium) | 310 | 283 | 283 | 283 | 283 | 283 |
| sucrose | 450 | 420 | 420 | 420 | 420 | 420 |
| Beads filling 1 | | 350 | | | | |
| Beads filling 2 | | | 350 | | | |
| Beads filling 3 | | | | 350 | | |
| Beads filling 4 | | | | | 350 | |
| Beads filling 5 | | | | | | 350 |
| Total | 1875 | 2100 | 2100 | 2100 | 2100 | 2100 |

*Contains wheat flour, modified starch, whey powder, oil, raising agents, wheat gluten, salt, emulsifiers, stabilisers All ingredients are weighed into a mixing bowl starting with the liquid ingredients: water, pasteurized eggs and oil. All ingredients are first manually mixed with a spatula and subsequently mixed with a planetary mixer (Hobart type N50) for 2 minutes at speed 1 and 2 minutes at speed 2. Portions of 300 g of batter are weighed into aluminum baking tin, placed on a baking tray and baked in a deck oven (MIWE Condo) at 180° C. for 45 minutes. After baking, the cakes (in the tins) are cooled on a rack for two hours at room temperature.

No breakage of the beads/particles was observed during the mixing of the cake ingredients or during the baking of the cakes.

The cakes have been further evaluated for several parameters:
The repartition of the beads into the cakes was visually checked.
The water activity ($a_w$) of the cakes was measured one day and 14 days after baking using the method described in example 1.
The taste of the cakes was evaluated by an expert taste panel (N=10). Both the global taste of the cakes and the specific taste of the fillings were evaluated.
The taste panel also evaluated the softness, moistness, the cohesiveness, and the resiliency using the score card presented in Table 4.

TABLE 4

| Score | Softness | Moistness | Cohesiveness | Resiliency/elasticity |
|---|---|---|---|---|
| 9 | extremely soft; no resistance | extremely moist | very cohesive, remains one piece | returns to 100% of its original shape |
| 7 | soft | very moist | cohesive | returns to 75% of its original shape |
| 5 | slightly soft | slightly moist | slightly crumbly | returns to 50% of its original shape |
| 3 | hard | dry | crumbly | returns to 25% of its original shape |
| 1 | extremely hard | extremely dry | very crumbly | does not returns to its original shape |

The results of the evaluation are presented in Table 5.

TABLE 5

|  | cakeref | cake1 | cake2 | cake3 | cake4 | cake5 |
|---|---|---|---|---|---|---|
| Beads repartition | none | nice repartition | better than cake1 | nice homogeneous repartition | better than cake3 | better than cake3 |
| water activity day 1 | 0.87 | nd | 0.9 | 0.9 | 0.89 | 0.89 |
| water activity day 14 | 0.84 | nd | 0.88 | 0.87 | 0.86 | 0.86 |
| taste of the cakes | no creamy sensation | good | good | good | creamy sensation with strong flavor | creamy sensation with strong flavor |
| taste of the filling | — | weak | weak and jelly | weak and jelly | good | good |
| softness day 1 | 7 | 7 | 7 | 7 | 7 | 7 |
| softness day 14 | 7 | 8 | 8 | 8 | 7 | 7 |
| moistness day 1 | 7 | 7 | 8 | 7 | 8 | 8 |
| moistness day 14 | 7 | 8 | 8 | 8 | 8 | 8 |
| cohesiveness day 1 | 7 | 6 | 7 | 7 | 7 | 7 |
| cohesiveness day 14 | 7 | 6 | 7 | 7 | 7 | 7 |
| resiliency day 1 | 7 | 7 | 7 | 7 | 7 | 7 |
| resiliency day 14 | 7 | 7 | 7 | 7 | 7 | 7 |

The results on the softness, the moistness, the cohesiveness and the resiliency show that the use of the beads of fillings according to the invention does not disturb the properties of the cakes when compared with a cake without filling.

Figure 2:
FIG. 2 shows a baked product comprising the food product according to the present invention.
Figure 3:
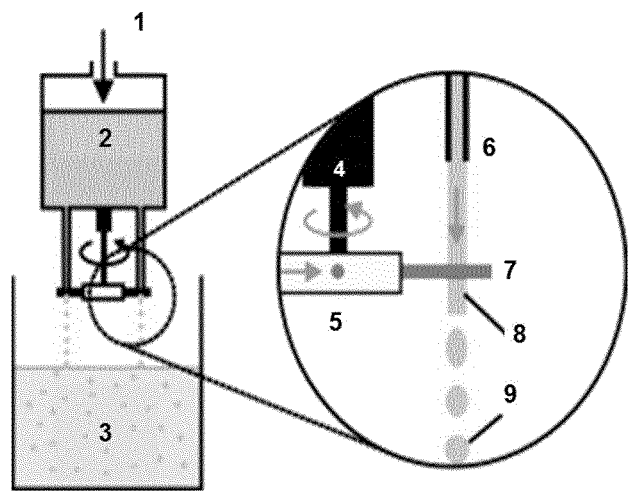
FIG. 3 provides an illustration of jet cutting technology.

FIG. 2 shows a picture of cakeref (left) and cake4 (middle). For clarity reasons, FIG. 2 (right) shows a picture of a cake with (intact) beads containing chocolate.

Example 3: Beads of Filling Preparation

A filling with the recipe of Table 6 was prepared as in Example 1. The calcium chloride was dispersed into the filling at the end of the process by using a KitchenAid robot for 15 minutes at 100 rpm.

TABLE 6

|  | % (w/w) 6 |
|---|---|
| Sugars (sucrose) | 50 |
| Modified Starch (E1442 (hydroxypropyl distarch phosphate)) | 6.6 |
| Thickeners (E460 (microcrystalline cellulose- - E466 (sodium carboxymethylcellulose) - E415 (xanthan gum)) | 0.5 |
| Flavors (Vanilline) - colours (E171 (titanium oxide) - E160a(i) (beta-carotene)) | 0.4 |
| Salt (NaCl) | 0.2 |
| Acid (E334 (L(+)-tartaric acid)) | 0.04 |
| Fat (palm fat) | 3 |
| Emulsifier (E473 - sucrose esters of fatty acids)) | 0.08 |
| potassium sorbate (E202) | 0.1 |
| Water | 37.08 |
| $CaCl_2$ | 2 |

The filling has a water activity between 0.88 and 0.90, a Brix between 60 and 62 and a dry matter between 60 and 62%.

The mixture was then extruded, through a 5 mm nozzle (Dosage 2000, France) in
  a 7 mg/g alginate (Algogel 3001) solution (test 6/beads 6) or
  a 7 mg/g alginate (Algogel 3001) solution containing 300 mg/g sucrose (test 7/beads 7) or
  a 5 mg/g alginate (Algogel 3001) solution containing 600 mg/g sucrose (test 8/beads 8)

Beads (particles) were formed by cutting the extrudate from the nozzle by mean of rotating cutting wires into cylindrical segments which then form beads due to their surface tension. The gelation time was 15 minutes. Afterwards the beads were rinsed in water (tests 6 and 7) or in a 600 mg/g sucrose solution (test 8) and let stand for 1 h30 at 25° C.

The properties of the beads are described in Table 7.

TABLE 7

|  | beads 6 | beads 7 | beads 8 |
|---|---|---|---|
| diameter (mm) | 9 mm | 8.5 mm | 7.4 mm |
| water activity ($a_w$) | 0.95 | 0.93 | 0.89 |
| dry matter (%) | 30% | 46% | 60% |
| Brix | 31 | 45 | 61 |

Example 4: Cakes

Cakes were prepared using the same recipes and processes as in example 2 using the beads of example 3 (beads 6 for cake6, beads 7 for cake7, beads 8 for cake8).

The cakes were evaluated as in Example 3. The results of the evaluation are presented in Table 8.

TABLE 8

|  | cakeref | cake6 | cake7 | cake8 |
| --- | --- | --- | --- | --- |
| Beads repartition |  | homogeneous | better than cake 6 | better than cake 6 |
| water activity day 1 | 0.87 | nd | 0.91 | 0.89 |
| water activity day 14 | 0.84 | nd | 0.89 | 0.87 |
| taste of the cakes | No creamy sensation | weak | good | very creamy |
| taste of the beads | — | perception of the bead shell weak taste | perception of the bead shell better than cake 6 | perception of the bead shell better than cake 7 |
| softness day 1 | 7 | 8 | 7 | 7 |
| softness day 14 | 7 | 8 | 8 | 7 |
| moistness day 1 | 7 | 9 | 8 | 8 |
| moistness day 14 | 7 | 8 | 8 | 8 |
| cohesiveness day 1 | 7 | 6 | 8 | 8 |
| cohesiveness day 14 | 7 | 7 | 7 | 7 |
| resiliency day 1 | 7 | 7 | 7 | 6 |
| resiliency day 14 | 7 | 6 | 7 | 7 |

Example 5: Consumer Test 3 cakes were prepared according to the method described in Example 2. The ingredients of the cake batters are listed in Table 9. The regular filling was made using the ingredients of filling 1 of Example 1 with water instead of alginate.

TABLE 9

| in grams | Cake without filling | Cake with conventional filling | Cake with beads of filling |
| --- | --- | --- | --- |
| water | 225 | 210 | 210 |
| wheat flour (Brabomills NV, Belgium) | 240 | 230 | 230 |
| pasteurized whole eggs | 350 | 327 | 327 |
| Rapeseed oil | 300 | 280 | 280 |
| Tegral Satin Cream Cake base* (Puratos NV, Belgium) | 310 | 283 | 283 |
| sucrose | 450 | 420 | 420 |
| Regular filling |  | 350 |  |
| Beads of filling 4 of example 1 |  |  | 350 |
| Total | 1875 | 2100 | 2100 |

*Contains wheat flour, modified starch, whey powder, oil, raising agents, wheat gluten, salt, emulsifiers, stabilisers The regular filling was deposited in the middle of the cake batter before baking.

The three cakes were presented to a panel of 40 untrained consumers. They were asked to taste the cakes and to rank them according to their preference. The results of the evaluation are presented in Table 10. Intermediate scores reflect the fact that, in some cases, consumers gave the same ranking to two cakes. (two equally preferred cakes: score 2.5; two equally less preferred cakes: score 1.5).

TABLE 10

| Score (%) | Cake without filling | Cake with conventional filling | Cake with beads of filling |
| --- | --- | --- | --- |
| 3 (most preferred) | 30 | 18 | 45% |
| 2.5 | 5 | 2 | 7 |
| 2 | 35 | 18 | 35% |
| 1.5 | 5 | 2 | 3 |
| 1 (least preferred) | 25 | 60 | 10% |

The cake with beads of filling is significantly preferred over the cake with a traditional filling:

The same consumers where asked how they would include a cake with beads of filling into their regular cake consumption. Compared to a cake without filling, a cake with beads of filling will mostly be preferably consumed. Compared to a cake with a traditional filling, it will mostly be preferably consumed.

Example 6: Creation of Beads of Filling

Figure 4A:
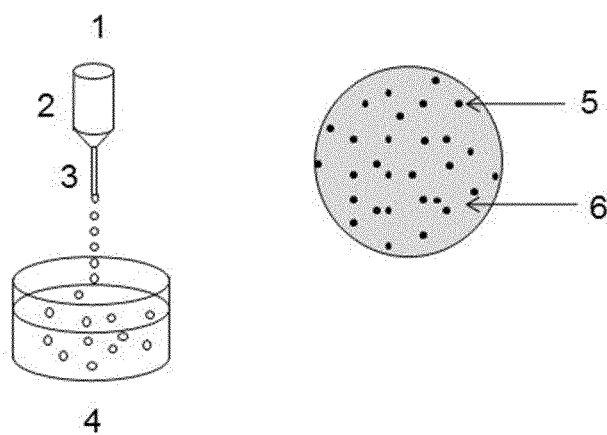
FIG. 4a shows a schematic representation of ionotropic gelation technology (direct gelation).
Figure 4B:
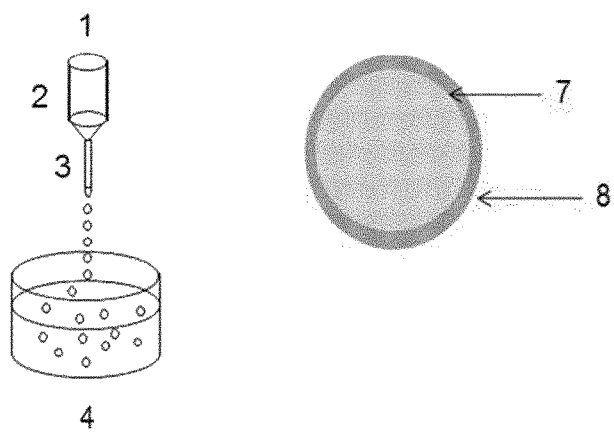
FIG. 4b shows a schematic representation of interfacial gelation technology (indirect gelation).
Figure 5:
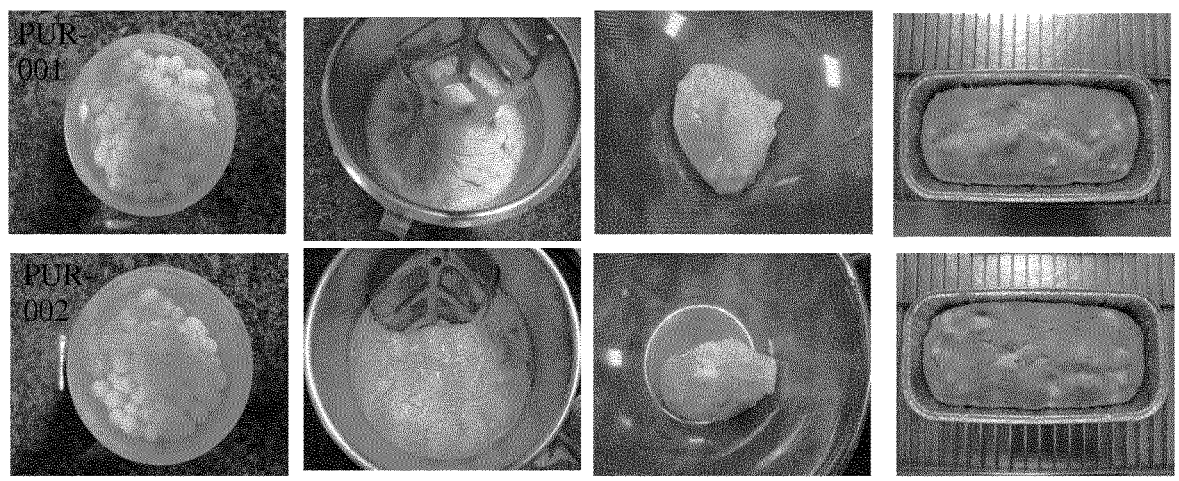
FIG. 5 illustrates the preparation method of a baked product comprising the food product according to the present invention.

The beads of filling can be created based on two different technologies: (a) ionotropic gelation technology (FIGS. 4a) and (b) interfacial gelation technology (FIG. 4b).

In ionotropic gelation, the ingredient mixture (1) containing food grade hydrocolloid, preferably alginate and/or pectin, is forced through a cylindrical device (2), such as a tube, a needle or a nozzle. At the exit (3) of the cylindrical device the drops are formed as described in Example 7. The drops (beads) are let in a gelation bath (4) containing a solution comprising food grade divalent cation(s) or trivalent cation(s), preferably, $Ca^{2+}$. The formed beads are characterized by a homogenous crosslinked matrix system (5-6) of hydrocolloids.

In interfacial gelation, the ingredient mixture (1) containing food grade divalent cation(s) or trivalent cation(s), preferably $Ca^{2+}$ is forced through a cylindrical device (2), such as a tube, a needle or a nozzle. At the exit (3) of the cylindrical device the drops are formed as described in Example 7. The drops (beads) are let in a gelation bath (4)

containing a solution comprising food grade hydrocolloid, preferably alginate and/or pectin. The formed beads are characterized by a core (7) and shell (8) having different property and viscosity.

Example 7: Jet Cutting Technology

The drops (beads) (9) are formed by forcing the ingredient mixture (2) as described herein through a cylindrical device, such as a nozzle (6), by using a pressure creating device (1) such as a pump. At the exit of the cylindrical device, beads (9) are formed by cutting the extrudate (8) from the nozzle (6) by mean of rotating cutting wires (7) into cylindrical segments which then form beads due to their surface tension. The rotating cutting wires are typically attached to a rotor (5) and powered by a motor (4). Finally, the drops are let to harden in a gelation bath (3).

Example 8: Texture of Beads of Fillings

Fillings were prepared using the ingredients of Table 11. Beads were obtained using the process described in example 1 with different gelation times and nozzle diameters as listed in Table 12.

TABLE 11

| % (w/w) | R1 | R2 | R3 |
|---|---|---|---|
| Sugars (sucrose) | 50 | 38 | 37 |
| Modified Starch (E1442 (hydroxypropyl distarch phosphate)) | 6.6 | 1 | 1 |
| Thickeners (E460 (microcrystalline cellulose- - E466 (sodium carboxymethylcellulose) - E415 (xanthan gum)) | 0.4 | 0.7 | 0.7 |
| Flavors (Vanilline) - colours (E171 (titanium oxide) - E160a(i) (beta-carotene)) | 0.4 | | |
| Chocolate (68% Dark; 32% Milk) | | 27.0 | 27.0 |
| Salt (NaCl) | 0.2 | 0.3 | 0.3 |
| Acid (E334 (L(+)-tartaric acid)) | 0.04 | 0.1 | 0.1 |
| Fat (palm fat) | 3 | | |
| Emulsifier (E473 - sucrose esters of fatty acids, E435 - polysorbate 60) | 0.08 | 0.03 | 0.03 |
| potassium sorbate (E202) | 0.1 | 0.1 | 0.1 |
| Water | 38.08 | 31.77 | 31.77 |
| Alginate (Algogel 3001, Cargill, Belgium) | 1 | 1 | 2 |

Texture analysis was used to determine the mechanical resistance of the beads of filling. A Texture Analyzer measures Forces, Distance and Time, thus providing a three-dimensional product analysis. In this particular case a measure force test in compression mode is applied on the beads. A measure force test gives the distance that the probe must pass through.

In compression mode, a probe moves down slowly at pretest speed until a threshold value (trigger) is reached. The probe then moves a set distance at a set speed into the sample material that is placed (or fixed) on the base table. The load is continuously monitored as a function of both time and distance until the probe again returns to its starting position. The texture Analyzer provides analysis of the force profile.

In the test one bead was placed in the middle of the base table of the Texture Analyzer (Stable Micro System TA.XTplus) and the following parameters were applied on the bead by using a 20 mm diameter probe:
Test Mode: compression
Pre-Test Speed: 0.2 mm/sec
Test Speed: 0.2 mm/sec
Post-Test Speed: 5.00 mm/sec
Target Mode: Distance
Distance: 3 mm
Trigger Type: Auto (Force)
Trigger Force: 2.0 g
Advanced Options: Off 10 different beads were tested for each recipe and the average was calculated. The used force at a penetration distance of 1.6 mm (TA-1.6 mm) and the total positive area (TA-area FT1:2) were used to compare and identify the texture of the beads.

TA-1.6 mm gives information on the hardness of the bead.
TA-area FT1:2 gives information on the internal strength of the bonds within a product.

TABLE 12

| Recipe of table 11 | Gelation time (min.) | Nozzle diameter (mm) | TA-1.6 mm (Force (g)) | TA-area FT1:2 (mJ) |
|---|---|---|---|---|
| R1 | 30 | 6 | 60 +/− 20 | 175 +/− 65 |
| R1 | 60 | 10 | 40 +/− 10 | 175 +/− 30 |
| R2 | 60 | 6 | 80 +/− 30 | 290 +/− 110 |
| R3 | 180 | 6 | 330 +/− 65 | 1050 +/− 270 |

The invention claimed is:

1. A food product comprising individually distinguishable, intact, homogenous beads, said beads comprising an ingredients mixture comprising:
   a) sugar or combination of two or more sugars in an amount between 20% and 75% (dry weight of the sugar or combination of two or more sugars/total mixture weight);
   b) starch(es) and/or modified starch(es) or combinations thereof in an amount between 0.5% and 10.0% (dry weight of the starch(es) and/or modified starch(es)/total mixture weight);
   c) food grade hydrocolloid or combination of two or more food grade hydrocolloids in an amount between 0.5% and 3% (dry weight of the hydrocolloid or combination of two or more hydrocolloids/mixture weight) or food grade di- and/or trivalent cations in an amount between 0.5% and 3% (dry weight of the cations/total mixture weight);
   d) one or more optional additional ingredients in amount(s) between 0 and 75% (dry weight of the one or more optional additional ingredients/total mixture weight); and
   e) water to bring the total mixture weight to 100%,
   wherein substantially all starch(es) and/or modified starch(es) or combinations thereof within the ingredients mixture are substantially gelatinized, wherein said ingredient mixture has a viscosity of at least 10000 cP and at most 300000 cP; wherein said beads have a water activity between 0.50 and 0.99 and a Brix index between 20 and 80, wherein said beads are individually distinguishable at each time point during the preparation process of the food product and/or wherein more than 90% of intact beads can be recovered after mixing a dough or batter comprising the food product and/or after baking thereof.

2. The food product according to claim 1, wherein the water activity of said beads ranges between 0.70 and 0.95.

3. The food product according to claim 1, wherein said beads are characterized by having a symmetric and homogeneous particle shape, optionally wherein said shape is selected from the group consisting of cubic, spherical, and cylindrical, and wherein the characterizing average diameter ranges between 2 mm and 20 mm.

4. The food product according to claim 1, wherein said food grade hydrocolloid is chosen from alginate or pectin or wherein said food grade di- and/or trivalent cations are chosen from $Ca^{2+}$, $Ba^{2+}$, $Fe^{2+}$, $Mn^{2+}$, $Mg^{2+}$, $Sr^{2+}$ and/or $Al^{3+}$.

5. The food product according to claim 1, wherein said sugar is chosen from sucrose, glucose, dextrose, fructose, invert sugar, and/or glucose syrup.

6. The food product according to claim 1, wherein said dairy ingredient is chosen from sweetened condensed skimmed milk, plain milk, milk powder, butter, and/or cream; wherein said egg is chosen from fresh egg, dried egg, and/or egg fraction that are optionally egg yolk and/or egg white; wherein said thickener is chosen from cellulose and/or xanthan gum; wherein said emulsifier is chosen from mono- and diglyceride of fatty acid and/or sucrose ester of fatty acid; wherein said acid is chosen from tartaric acid, citric acid, and/or glucono delta lactone; wherein said preservative is potassium sorbate; and/or wherein said coloring agent is beta-carotene and/or titanium dioxide.

7. A dough or batter comprising the food product according to claim 1.

8. A baked product comprising the food product according to claim 1.

9. The baked product according to claim 8, comprising at least 90% (weight of recovered beads/initial weight of the beads) of the beads added before baking.

10. The baked product according to claim 8, wherein the water activity of the crumb and of the beads differs by at most 10% or at most 5%.

11. A method for preparing a food product comprising individually distinguishable, intact, homogenous beads, said method comprising the steps of:
   a) preparing a mixture of ingredients comprising
      i) sugar or combination of two or more sugars in an amount between 20% and 75% (dry weight of the sugar or combination of two or more sugars/total mixture weight);
      ii) starch(es) and/or modified starch(es) or combinations thereof in an amount between 0.5% and 10.0% (dry weight of the starch(es) and/or modified starch(es)/total mixture weight);
      iii) food grade hydrocolloid, combination of two or more food grade hydrocolloids in an amount between 0.5% and 3% (dry weight of the hydrocolloid or combination of two or more hydrocolloids/mixture weight), or food grade di- and/or trivalent cations in an amount between 0.5% and 3% (dry weight of the cations/total mixture weight);
      iv) one or more optional additional ingredients in amount(s) between 0 and 75% (dry weight of the one or more optional additional ingredients/total mixture weight); and
      v) water to bring the total mixture weight to 100%, wherein substantially all starch(es) and/or modified starch(es) or combinations thereof within the ingredients mixture are substantially gelatinized, wherein said ingredient mixture having a viscosity of at least 10000 cP and at the most 300000 cP;
   b) generating drops of said ingredients mixture;
   c) obtaining beads by contacting said drops with a solution containing di- and/or trivalent cations in a concentration of at least 5 and at most 50 mg/g or with a solution containing food grade hydrocolloid(s) in a concentration of at least 5 and at most 50 mg/g, with the proviso that when hydrocolloid(s) are used in the mixture of ingredients a solution containing di- and/or trivalent cations is used, and when di- and/or trivalent cations are used in the mixture of ingredients a solution comprising food grade hydrocolloid(s) is used; said solution optionally comprising an osmotic pressure generating component; and
   d) optionally rinsing the obtained beads with a rinsing solution;
wherein said beads have a water activity between 0.50 and 0.99 and a Brix index between 20 and 80, wherein said beads are individually distinguishable at each time point during the preparation process of the food product and/or more than 90% of intact beads can be recovered after mixing a dough or batter comprising the food product and/or after baking thereof.

12. The method according to claim 11, wherein step (b) is performed by cutting a flow of the ingredients with the aid of a cutting device, optionally using rotating wires.

13. The method according to claim 11, wherein the food grade hydrocolloid is chosen from alginate or pectin; and wherein the food grade cations are chosen from $Ca^{2+}$, $Ba^{2+}$, $Fe^{2+}$, $Sr^{2+}$, $Al^{3+}$, optionally wherein the food grade cations are under the form of $CaCl_2$), $CaCl_2 \cdot 2H_2O$, calcium iodate, calcium lactate, $CaSO_4$, calcium propionate, or iron oxalate.

14. The method according to claim 11, wherein the solution of step (c) and/or the rinsing solution of step (d) has a water activity that differs from the water activity of the ingredient mixture by at most 10%.

15. The method according to claim 11, wherein the solution of step (c) and/or the rinsing solution of step (d) is a solution containing at least 500 mg/g sucrose and at the most 650 mg/g sucrose.

16. A method for preparing a dough or batter comprising the step of adding to the dough or batter the food product according to claim 1.

17. A method for preparing a baked product comprising the step of adding to the dough or batter the food product according to claim 1 and baking said dough or batter.

18. The food product according to claim 1, wherein said beads consist of a homogenously crosslinked matrix system of hydrocolloids.

19. The food product according to claim 1, wherein said beads are prepared by ionotropic gelation.

20. The food product of claim 1, wherein the one or more optional additional ingredients are selected from the group consisting of egg, egg derivative, thickener, fruit, chocolate, cocoa powder, dairy ingredient, fat, emulsifier, salt, acid, preservative, coloring agent, flavoring agent, and any combinations thereof.

21. The food product of claim 1, wherein said beads comprise an ingredients mixture comprising starch(es) and/or modified starch(es) or combinations thereof in an amount between 0.5% and 8% (dry weight of the starch(es) and/or modified starch(es)/total mixture weight).

* * * * *